US005570345A

United States Patent [19]
Kaprielian et al.

[11] Patent Number: 5,570,345
[45] Date of Patent: Oct. 29, 1996

[54] PROTECTION SWITCHING SYSTEM WITH SINGLE LINE CONTROL

[75] Inventors: Mark Kaprielian, Framingham; Karen Brim, Leominster, both of Mass.; Lewis Kenyon, Nashua, N.H.

[73] Assignee: Telco Systems, Inc., Norwood, Mass.

[21] Appl. No.: 414,275

[22] Filed: Mar. 31, 1995

Related U.S. Application Data

[63] Continuation-in-part of Ser. No. 220,975, Mar. 31, 1994.

[51] Int. Cl.⁶ ........................................... H04L 1/22
[52] U.S. Cl. ............................................ 370/16; 395/181
[58] Field of Search ............................ 370/16, 16.1, 60, 370/60.1, 58.1; 340/825.01; 455/8; 395/181, 181.01, 181.02, 181.09, 181.11

[56] References Cited

U.S. PATENT DOCUMENTS

| | | | |
|---|---|---|---|
| 4,228,535 | 10/1980 | Workman et al. | 370/16 |
| 5,072,440 | 12/1991 | Isono et al. | 370/16 |
| 5,408,462 | 4/1995 | Opoczynski | 370/16 |

*Primary Examiner*—Douglas W. Olms
*Assistant Examiner*—Ajit Patel
*Attorney, Agent, or Firm*—Wolf, Greenfield & Sacks, P.C.

[57] ABSTRACT

The invention performs very fast switching between a main module and a standby module in the event of module failure. A single control line has different logic level signals applied thereto in the event of a main module failure and a standby module failure, with the signals on the control line being utilized to efficiently switch the on-line status of the modules to a desired state.

12 Claims, 2 Drawing Sheets

| MODULE STATUS | | CONTROL LINE | MODULE ONLINE |
| --- | --- | --- | --- |
| MAIN | STANDBY | | |
| GOOD | FAIL | 0 | MAIN |
| FAIL | GOOD | 1 | STANDBY |
| GOOD (MOL) GOOD | GOOD GOOD (SOL) | 0 1 | MAIN STANDBY |
| FAIL (MOL) FAIL | FAIL FAIL (SOL) | 1 1 | STANDBY STANDBY |

FIG. 2

PROTECTION SWITCHING SYSTEM WITH SINGLE LINE CONTROL

This application is a Continuation-in-Part of application Ser. No. 08/220,975 filed Mar. 31, 1994 and the content of this application are incorporated herein by reference.

FIELD OF THE INVENTION

This invention relates to systems for controlling the on-line status of a main and a protection or standby module in a system where only one such module is on-line at any given time, and more particularly to such a system which utilizes a single control line for the modules to effect more rapid switching if one of the modules fails or if it is otherwise desired to switch between modules.

BACKGROUND OF THE INVENTION

In systems where high reliability is required, such as in telephony or other communication systems where a significant loss of traffic is unacceptable, it is common to provide redundant modules in the system which operate in parallel on the same inputs. Normally the output from only one such module is utilized, with the system switching to utilize outputs from the other module in the event of a failure in the original module. Since once a module fails, data outputted from that module is unreliable, it is desirable to get a failed module off-line as quickly as possible. Further, since a delay in getting the standby module on-line can result in data being lost, it is also desirable to get The standby module on-line as quickly as possible. However, there has heretofore been a relatively complicated protocol, particularly in communications applications, to communicate a failure to both modules and to then effect the necessary switching to get the failed module off-line and a good module on-line. This has resulted in either excessive switching delay, due to slow message oriented communication protocols on a shared hardware resource, or an unreasonably large number of backplane connections to control switching between the working or main and protection or standby modules. Often the number of backplane connections dictate the number of features a given module can offer. Therefore, while dedicated hardware allows for very fast switching, it also limits the modules features. However, with the high speed data transmission lines currently being utilized, this excessive delay can result in the loss of substantial data. Further, since once a module fails, it is assumed to be unreliable, any switching to a replacement module must be done without involvement of the failed module, main and standby modules should also be identical so as to be interchangeable.

It is therefore desirable that a technique be developed which substantially reduces the time delay between the detection of a module failure and the completion of a replacement module being brought on-line, while requiring a minimum number of backplane connections, and without requiring involvement of a failed module in the switching process.

SUMMARY OF THE INVENTION

In accordance with the above, this invention performs very fast switching through a dedicated single hardware connection per switched circuit. A background message oriented communication scheme is also required to update the state models in each module, but this update can be quite slow. More specifically, the invention provides a single control line which has different signals applied thereto in the event of a main module failure or a standby module failure. These signals are utilized to selectively switch the on-line status of the modules to a desired state.

More particularly, a circuit is provided for controlling which one of a main module and a standby module are on-line at any given time. The single control line extends between the modules and receives inputs from both modules. The main module applies a first signal to the control line when the main module fails or is otherwise taken off-line, and the standby module applies a second signal to the control line when the standby module fails or is otherwise to be taken off-line. Circuitry is provided which is responsive to the signal on the control line for selectively switching the modules such that only one of the modules is on-line at a time. For a preferred embodiment, when only one of the modules is good, the good module is the one which is on-line; where both modules are good, the current on-line status of the modules is maintained; and where both modules have failed, the system can cause either of the modules to be on-line (for the preferred embodiment, the standby module is chosen to be on-line in this circumstance).

Each module may also apply a signal to the control line to take the module off-line regardless of the condition of the module. Thus, the module may be taken off-line for preventive maintenance or for other purposes. In particular, at least one processor may be included which causes signals to be applied to the control line to take a module off-line. There may be a separate processor associated with each module or the signals may be derived from a background processor.

A switch may also be provided for each module with the on-line status of each module being controlled by the state of the corresponding switch. A gate may also be provided for each module for applying a control input to the corresponding switch, the gate receiving the signal on the control line as an input and generating outputs to control their respective switches to opposite states in response to a given signal on the control line. For a preferred embodiment, the gates are exclusive-OR gates, their signals are binary voltage levels, a voltage level which is the same as that of the second signal is applied as a second input to the exclusive-OR gate for the main module and a voltage level which is the same as that for the first signal is applied as a second input to the exclusive-OR gate for the standby module. With a processor for each module, both processors cause the second signal to be applied to the control line when the main module is on-line and good while the processor for the standby module causes the first signal to be applied to the control line after the main module fails.

The foregoing other objects, features and advantages of the invention will be apparent from the following more particular description of a preferred embodiment of the invention as illustrated in the accompanying drawings.

IN THE DRAWINGS

FIG. 2 is a chart illustrating the value on the control line and the module on-line for the various status conditions of the modules.

DETAILED DESCRIPTION

Figure 1:
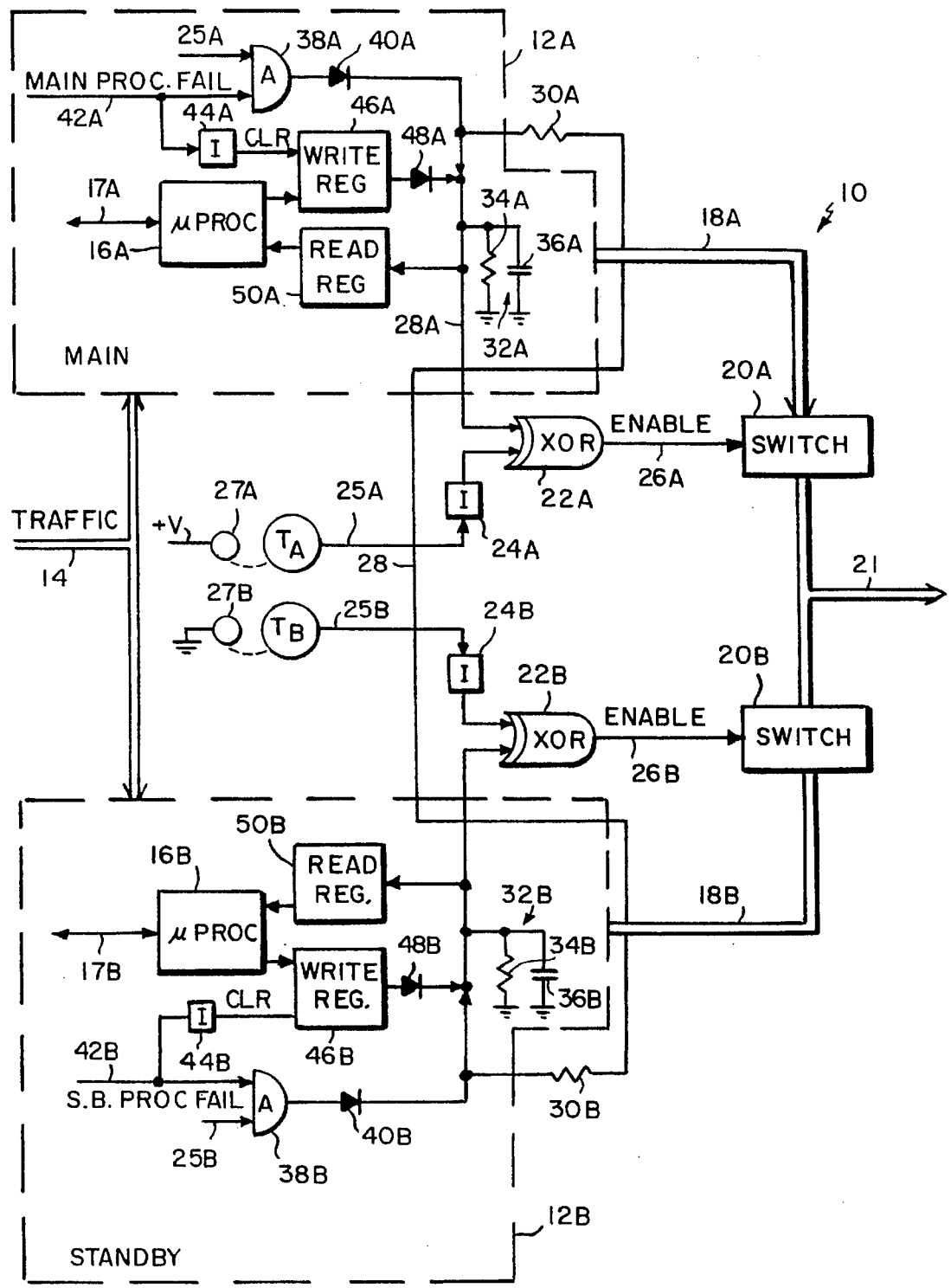
FIG. 1 is a schematic semi-block diagram of a system in accordance with the teaching of this invention.

Referring first to FIG. 1 a system 10 is shown which includes a main module 12A and a standby module 12B. For preferred embodiments, the main and standby modules are identical and are interchangeable, the difference being, as will be discussed later only in their location with respect to backplane/background circuitry. Each module receives traffic derived from a common input source 14, which traffic may be data, voice, video or other information depending, on the nature of the system. Lines 14 may be wire or fiber optic telephone lines, or may be lines or cables of some other communications network. Modules 12 would typically be located at a control unit, an end office, a central office, or the like for a telephony system (see parent application) or some other appropriate control station for other types of communications system. Each module contains a microprocessor 16A, 16B which may communicate with a background/ backplane processor (not shown) over bidirectional lines 17A, 17B respectively, and which, either alone or in conjunction with other circuitry not shown, may perform selected operations on the received data. For example, each module 12 may also receive additional data from other sources over additional lines and may multiplex such received data before outputting the data on output lines 18A, 18B from the module, or the module may perform other operations on the data which are known in the art. The exact function of the modules is not part of the present invention. What is important is that the operations performed on incoming data by both main module 12A and standby module 12B are identical, so that the outputs appearing on output lines 18A and 18B are also identical. The outputs on lines 18A and 18B are applied through switches 20A and 20B respectively to a common system output line 21. The module 12 which is on-line at any given time is determined by which of the switches 20 is enabled or closed. The system is designed so that only one of the switches 20 will be enabled at a time.

Each switch 20 receives an enable input from a corresponding exclusive-OR gate 22A, 22B with each switch 20 being closed or enabled when the corresponding exclusive-OR gate 22 generates a ZERO or ground output and being opened or disabled when the corresponding exclusive-OR gate 22 generates a ONE or V+ output.

One input to each exclusive-OR gate 22 is the output from an inverter 24A, 24B respectively. The input line 25A, 25B to each inverter is connected to a terminal $T_A$, $T_B$ respectively. These terminals connect to corresponding terminals 27A and 27B on the backplane for the slot position in which the module is mounted, the terminal 27A for the main module position having a voltage V+ applied thereto, which voltage is the same as that of a logical ONE level. This voltage on the terminal 27A defines the slot as a main module slot. Similarly, the backplane terminal 27B has a ground or ZERO level applied thereto, this level on terminal 27B defining the slot as a standby module slot. Thus, a module 12 becomes a main or standby module depending on the potential on terminal 27 for the slot in which the module is mounted. Line 28 is connected as the second input to gate 22A through a resistor 30A and as the second input to gate 22B through a resistor 30B.

The effect of the inputs to exclusive-OR gate 22A is that it does not alter the signal on common control line 28, the logical output from this gate being the same as The logical input received by this gate on line 28. However, exclusive-OR gate 22B inverts the signal on common control line 28. Thus, while switch 20A is closed, switch 20B is open, and while switch 20A is open, switch 20B is closed. Therefore, only one of the modules can be on-line at any given time.

The portion 28A, 28B of control line 28 on the module side of each resistor 30 has a number of connections thereto. In particular, there is a noise filter 32A, 32B connected to control line portions 28A, 28B, respectively, each noise filter consisting of a resistor 34A, 34B respectively, and a capacitor 36A, 36B respectively. An AND gate 38A, 38B is connected to each corresponding common line portion through a corresponding diode 40A, 40B. One input to gate 38A is line 25A from terminal $T_A$ (i.e., a V+ or logical ONE level) and one input to gate 38B is line 25B from terminal $T_B$ (i.e., a ground or logical ZERO level). The other input to gate 38A is a signal on line 42A which is indicative of failure in main module 12A/main processor 16A, while the second input to gate 38B is a signal on line 42B which is indicative of a failure in standby module 12B/standby processor 16B. For the preferred embodiment the signals on lines 42A and 42B, are obtained from a background computer (not shown) which periodically interrogates the microprocessors and/or other portions of the modules and generates an output on the appropriate line 42 if a suitable response is not received to the interrogation.

A signal on a line 42 is also applied through a corresponding inverter 44A, 44B as a logical ZERO "clear" input to a corresponding write register 46A 46B. In normal operation the write register receives outputs from the corresponding microprocessor 16. Appropriate outputs from the write register 46 are applied through a corresponding diode 48A, 48B to the corresponding common control line portions, 28A, 28B. Finally, signals on the control line at each module are applied through a corresponding read register 50A, 50B to the corresponding microprocessor.

In operation, assume that main module 12A is initially on-line, that standby module 12B is initially off-line, and that both modules are initially good. This is the situation illustrated on the third line in FIG. 2 which indicates that the control line is at ZERO or ground potential under this situation. Thus, in order to maintain a main module in an on-line condition, a ground potential or logical ZERO must be applied to control line 28 by both microprocessors 16A and 16B through their respective write registers 46A and 46B. Microprocessor 16A will normally provide a logical ZERO to its write register when the module is good. However, microprocessor 16B, knowing from its backplane inputs that it is part of a standby module, would normally apply a +V or logical ONE level to its write register when the module is good and the standby module is on-line. However, when the main module is on-line, this information is communicated through a background communication path and through line 17B to microprocessor 16B. This input causes microprocessor 16B to generate a ZERO output to its write register even though the module is good. Thus, all inputs to the control line are at a logical ZERO level, resulting in a logical ZERO output from exclusive-OR gate 22A to enable switch 20A and resulting in a logical ONE output from exclusive-OR gate 22B (this gate inverting the level on control line 28) to disable switch 20B thereby rendering the standby module off-line. Thus live traffic passes through switch 20A and is blocked by switch 20B.

The condition described above continues to exist so long as main module 12A remains good, and, referring to the first line of FIG. 2, will continue to exist even if standby module 12B fails, so long as main module 12A remains good.

However, if main module 12A fails, then the signal on the control line goes to +V or ONE. This may be accomplished in at least two ways. First, it may be accomplished by processor 16A either determining that for some reason such as a local fault, the main module should be taken off-line or, more likely, by a signal on line 17A from the background control processor ordering processor 16A to take module 12A off-line. When this occurs, the processor puts a logic level ONE signal through write register 46A onto the control line, causing the line to go to a logic ONE level. A second option is that the background processor does not receive a proper response to an interrogation of the module and, as a result, puts a signal on line 42A which, since there is always a logic ONE on line 25A, is passed by AND gate 38A and diode 40A to put a logic ONE on the control line. Read registers 50A and 50B detect the ONE on the control line and provide inputs to their respective microprocessors that a failure has occurred in the main module. The signal on line 42A is also inverted by inverter 44A to clear write register 46A to generate a logic ZERO.

Following a switch from main to standby on-line switch positions, the standby microprocessor by interrogating read register on port 50B also writes a logical ONE on its write register or port output 48B, and then sends a message through lines 17B and the system control bus (not shown) that it is on-line. If the main microprocessor 16A is subsequently operating successfully, and the conditions forcing the initial switch action passes, or is otherwise corrected, the main microprocessor puts a ZERO on its write register 46A output. However, a logical ONE level remains on the control line as a result of the logical ONE output onto the control line from write register 46B. Note that the system state has changed from main and standby good, main on-line to main and standby good, standby on-line. Also the main module microprocessor has positioned itself such that a single switch command from the on-line standby microprocessor will simultaneously force both main and standby switch actions.

It should again be noted that the main module may be taken off-line for reasons other than failure. For example, the main module may be taken off-line to permit routine maintenance to be performed on the main module card, to permit replacement of the card, or for other reasons, The decision to take the main module off-line can be made at microprocessor 16 or can be made by the microprocessor in response to instructions from a background processor.

However the ONE signal on control line 28 originates, the ONE on this line, in conjunction with the ZERO input from inverter 24A into exclusive-OR gate 22A, causes the gate output to go to a ONE or +V, thereby disabling switch 20A and taking main module 12A off-line. Simultaneously with this occurring, the ONE on the control line, in conjunction with the one output from inverter 28B causes exclusive-OR gate 22B to generate a ZERO output on line 26B which enables switch 20B putting standby module 12B on-line. Since the two switches operate simultaneously in response to the same signal on a single control line, the switching can occur very quickly, for example within 50 milliseconds, thereby minimizing loss of data. Once the switching has occurred, The switches are maintained with switch 20B enabled and switch 28A disabled.

The system remains in a condition with the standby module on-line until either the standby module fails at a time when the main module is good or until a decision is made by standby microprocessor 16B, the background processor, a system operator or otherwise to take the standby module off-line. In particular, referring to the fourth line in FIG. 2, even if the main module becomes good while the standby module is on-line, the logic ONE continues to exist on the control line so that the system remains with the standby module on-line. When the standby microprocessor 16B detects an internal fault (or is instructed to take the module off-line) or when the background processor does not receive a proper response to an interrogation of module 16B, a ZERO is set on the output of register 46B either by processor 16B or by a fail signal on line 42B being inverted by inverter 44B to clear the write register. The later operation is required since a failed processor 16B cannot be relied upon to take itself off-line. Together with the ZERO potential existing on the good main module microprocessor's write register, this forces the standby switch 20B off-line and the main switch 20A on-line. (Note that unlike the AND gate 38A for the module positioned in the main slot, AND gate 38B for the standby module is unable to pass the standby processor fail signal on line 42B to the common control line because line 26B is permanently held at ZERO.)

On the simultaneous occurrence of both main and standby module failures, the system will be positioned to standby on-line. This is because a standby failure generates a ZERO at write register 46B while a main failure generates a ONE at either write register 46A or diode 40A. Since all driving signals are diode applied to the common line, a ONE on any source for the control line overrides all other ZERO'S, forcing the system to standby mode.

While the invention has been described above with respect to a communications application, and that is the application where main and standby modules are most frequently utilized, the single line control concept of this invention might also be utilized in other applications where high reliability is required, where such reliability is achieved by use of redundant modules, and where a need exists to rapidly switch a new module on-line in the event the module currently being used fails. Further, while specific circuitry has been shown in FIG. 1 for implementing the invention, such implementation is provided for purposes of illustration only and other circuitry capable of implementing the concepts of this invention may be utilized to implement the invention. In particular, depending on applications, the level or logical state on the control line which is used to bring the main and standby modules on-line may be varied, default conditions when both modules are good or when both modules fail may be altered, and the specific circuitry/ controls for putting required potentials on the control line and for switching modules in response to such potential may also vary.

Thus, while the invention has been particular shown and described with reference to a preferred embodiment, the foregoing and other changes in form and detail may be made therein by one skilled in the art without departing from the spirit and scope of the invention.

What is claimed is:

1. In a system having a main module and a standby module, only one of which is to be on-line at any given time, a circuit for controlling the one of said modules which is on-line comprising:

a single control line extending between the modules and receiving inputs from both modules;

means at the main module for applying a first signal to said control line when the main module fails;

means at the standby module for applying a second signal, different from the first signal, to the control line when the standby module fails; and means responsive to a signal on the control line for selectively switching the on-line status of said modules in a manner such that only one of said modules is on-line at a time.

2. A circuit as claimed in claim 1 wherein said modules are communications modules through which the same traffic is simultaneously passed, and including a switch responsive to one of said modules being on-line for passing traffic outputted by the on-line module to a system output line.

3. A circuit as claimed in claim 1 wherein each of said modules may be in a good or a failed condition, and wherein said means for selectively switching is responsive to a signal on the control line to assure that where at least one of said modules is good, the module on-line in a good module.

4. A circuit as claimed in claim 3 wherein when both modules are good, said means for selectively switching does not change the one said modules which is on-line.

5. A circuit as claimed in claim 4 including means at each module for applying a signal to the control line to take the module off-line regardless of the condition of the module.

6. A circuit as claimed in claim 5 including at least one processor for said modules, and wherein said at least one processor causes signals to be applied to the control line to take a module off-line regardless of its condition.

7. A circuit as claimed in claim 3 wherein said means for selectively switching is operative, where both modules have failed, to cause the standby module to be on-line.

8. A circuit as claimed in claim 1 wherein said means for selectively switching including a switch for each module, the on-line status of each module being controlled by the state of the corresponding switch, and a gate for applying a control input to each switch, the gates both receiving the signal on the control line as an input and generating outputs to control their respective switches to opposite states in response to a given signal on the control line.

9. A circuit as claimed in claim 8 wherein said gates are exclusive-OR gates, wherein said signals are voltage levels, and wherein a voltage level which is the same as that for the second signal is applied as a second input to the exclusive-OR gate for the main module, and a voltage level which is the same as that for the first signal is applied as a second input to the exclusive-OR gate for the standby module.

10. A circuit as claimed in claim 1 including a processor for each module, and wherein both processors cause the second signal to be applied to the control line when the main module is on-line and good, while the processor for the standby module causes the first signal to be applied to the control line after the main module fails.

11. In a system having a main module and a standby module, only one of which is to be on-line at any given time, a circuit for controlling the one of said modules which is on-line comprising:

a single control line extending between the modules and receiving inputs from both modules;

a circuit at the main module which applies a first signal to said control line when the main module fails;

a circuit at the standby module which applies a second signal which is different than the first signal to the control line when the standby module fails;

a gate for each module, the control line being connected as one input to each gate, the gates generating different outputs in response to a given signal on the control line; and a switch for each module which control the on-line states of the module, each of said switches being responsive to one of the outputs from the corresponding gate for being enabled and to the other output from the corresponding gate for being disabled.

12. A circuit as claimed in claim 11 wherein said gates are exclusive-OR gates, wherein said signals are voltage levels, and wherein a voltage level which is the same as that for the second signal is applied as a second input to the exclusive-OR gate for the main module, and a voltage level which is the same as that for the first signal is applied as a second input to the exclusive-OR gate for the standby module.

* * * * *